United States Patent [19]
Moses

[11] Patent Number: 5,528,494
[45] Date of Patent: Jun. 18, 1996

[54] STATISTICALLY BASED THUNDERSTORM CELL DETECTION AND MAPPING SYSTEM

[75] Inventor: Randolph L. Moses, Worthington, Ohio

[73] Assignee: B. F. Goodrich Flight Systems, Inc., Columbus, Ohio

[21] Appl. No.: 319,364

[22] Filed: Oct. 6, 1994

[51] Int. Cl.⁶ .............................. G06F 169/00
[52] U.S. Cl. ............................................ 364/420
[58] Field of Search ................... 364/420; 342/460,
342/26; 324/72; 340/601, 825.49; 395/931

[56] References Cited

U.S. PATENT DOCUMENTS

| | | | |
|---|---|---|---|
| 3,973,258 | 8/1976 | Cerni et al. | 342/26 |
| 4,023,408 | 5/1977 | Ryan et al. | 73/170 R |
| 4,672,305 | 6/1987 | Coleman | 324/72 |
| 4,801,942 | 1/1989 | Markson et al. | 342/460 |
| 4,803,421 | 2/1989 | Ostrander | 324/72 |
| 4,972,195 | 11/1990 | Markson et al. | 342/460 |
| 5,245,274 | 9/1993 | Youngquist | 324/72 |
| 5,295,071 | 3/1994 | Kuzma et al. | 364/420 |

OTHER PUBLICATIONS

Hans Volland, "CRC Handbook of Atmospherics", vol. 1, pp. 190–199.
B. M. Stevens, Jr. et al., "A Lightning Data Acquisition System", Jun. 24–26, 1986, International Aerospace and Ground Conference on Lightning and Static Electricity, Dayton, Ohio.

Primary Examiner—Donald E. McElheny, Jr.
Attorney, Agent, or Firm—Mark D. Saralino; William E. Zitelli

[57] ABSTRACT

A thunderstorm cell detection and mapping system is provided, including means for acquiring lightning strike information relating to locations of respective lightning strikes, means for clustering the lightning strikes into groups corresponding to respective active thunderstorm cells by determining a logarithmic distribution of the lightning strike information, and means for locating the active thunderstorm cells based on the lightning strike information.

39 Claims, 10 Drawing Sheets

STATISTICALLY BASED THUNDERSTORM CELL DETECTION AND MAPPING SYSTEM

TECHNICAL FIELD

The present invention relates generally, as is indicated, to a thunderstorm cell detection and mapping system which is based on a statistical analysis of lightning location estimates. More particularly, the present invention relates to a system which includes lightning range compression based on logarithmic distribution properties of lightning strikes to obtain increased accuracy.

BACKGROUND OF THE INVENTION

It is well known that thunderstorms present a serious threat to airborne craft as a result of the dangerous turbulence, up and down drafts, wind shear and other violent atmospheric disturbances generated thereby. Thunderstorms for the most part are comprised of clusters of cells which grow and dissipate within the storm through a variety of stages. Most of the violent lightning occurs coincidentally with the violent atmospheric disturbances during the mature stage of the storm cells. This strong correlation between the threatening atmospheric disturbances and electrical discharges was used by Ryan to create a weather mapping system known as Stormscope®, which was disclosed in the U.S. Pat. No. 4,023,408 and which is currently assigned to the same assignees as the instant application.

The Ryan system is capable of measuring pulse type electromagnetic radiation generated through the atmosphere from the large electric currents flowing within the lightning channel during a lightning stroke for the detection thereof. Ryan's system used an inverse relationship of the measured radiation to map the detected lightning strike on a display in range and bearing relative to an observation location which, for example, may be the location of the aircraft. In one embodiment, the observation location was calibrated at the center of the display screen and each displayed stroke appeared as a substantial point source at a bearing and radial dimension from the screen center, the radial dimension being proportional to the range measurement of the corresponding lightning stroke. The dimension between the displayed stroke and screen center was not necessarily a measure of the actual range from the aircraft to the stroke but rather an approximation of range based on a mix of distance and intensity information of the detected lightning stroke.

In addition, a U.S. Patent bearing the number U.S. Pat. No. 4,672,305 and issued to Coleman is directed to a lightning detection system which uses a ratio of low (1.5 kHz) and high (500 kHz) frequency magnetic field components to extend the range thereof. Further, U.S. Pat. No. 4,803,421, and its divisional counterpart U.S. Pat. No. 4,873,483, both issued to Ostrander and assigned to the same assignee as the instant application, are directed to lightning detection and mapping systems which determine lightning locations from the ratio of the integrated intensity of two different field components of lightning generated signals. Also, a data acquisition system for use in gathering lightning strike data is present in the paper "A Lightning Data Acquisition System", authorized by B. M. Stevens, Jr. et al. for the International Aerospace and Ground Conference on Lightning and Static Electricity at Dayton, Ohio, Jun. 24–26, 1986.

Another U.S. Patent bearing the number U.S. Pat. No. 5,295,071 and currently assigned to the same assignee as the present application, uses a filter-based method for estimating the location of the lightning strike. The lightning strike signal is passed through a series of band pass filters and the filter outputs are used to determine the range and bearing of the lightning strike.

Although each of the systems discussed above offers significant advantages in the detection and mapping of lightning strikes, there remains areas for improvement. For example, many of these systems estimate the location of each lightning strike based on single-strike processing algorithms, i.e., processing which determines the location of a strike independent of the location estimates for other detected strikes. As a result, such systems are limited in their accuracy to the extent location information can be discerned from a single strike. An area for improvement is an additional criteria for increasing the accuracy of such systems based on the statistical properties of multiple detected lightning strikes. In particular, there is a need for a system which analyzes single-strike information for multiple strikes and clusters the information to improve strike location accuracy as well as thunderstorm cell location accuracy.

SUMMARY OF THE INVENTION

According to one particular aspect of the present invention, a thunderstorm cell detection and mapping system is provided, including means for acquiring lightning strike information relating to locations of respective lightning strikes, means for clustering the lightning strikes into groups corresponding to respective active thunderstorm cells by determining a logarithmic distribution of the lightning strike information, and means for locating the active thunderstorm cells based on the lightning strike information.

According to another aspect of the present invention, a thunderstorm cell detection and mapping system is provided, including means for acquiring lightning strike data relating to respective lightning strikes, means for calculating a range estimate for each of the respective lightning strikes based on the lightning strike data, means for clustering the lightning strikes into groups corresponding to respective active thunderstorm cells by determining a logarithmic distribution of the range estimates, and means for locating each of the active thunderstorm cells based on the range estimates for the lightning strikes included in the group corresponding to the active thunderstorm cell.

According to yet another aspect of the present invention, a thunderstorm cell detection and mapping system with invalid data rejection capabilities is provided, including means for receiving lightning strike data representative of a detected lightning strike, means for associating the detected lightning strike with an existing active thunderstorm cell in the event a first predetermined criteria is satisfied, the first predetermined criteria being based on a comparison of a logarithm of the lightning strike data representative of the detected lightning strike with logarithms of other lightning strike data representative of other lightning strikes previously associated with the active thunderstorm cell, means for associating the detected lightning strike with a new active thunderstorm cell in the event a second predetermined criteria is satisfied, and means for rejecting the lightning strike data representative of the detected lightning strike as being invalid in the event neither the first nor second criteria is satisfied.

According to another particular aspect of the present invention, a system for estimating a location of a detected lightning strike with reference to an observation location is provided, including means for receiving signals related to locations of respective lightning strikes relative to the observation location, means for determining a characteristic of a logarithmic distribution of at least a plurality of the signals, and means for estimating the location of at least one of the lightning strikes based on the characteristic.

According to another aspect of the present invention, a system for estimating a location of a detected lightning strike with reference to an observation location is provided, including means for receiving signals related to locations of respective lightning strikes relative to the observation location, means for calculating a gross range estimate for each of the respective lightning strikes based on the received signals, means for determining a characteristic of a logarithmic distribution of at least a plurality of the gross range estimates, and means for refining at least one of the gross range estimates based on the characteristic to form a compressed range estimate.

According to yet another aspect of the present invention, a lightning strike detection and mapping system is provided, including means for receiving signals indicative of locations of respective lightning strikes, means for obtaining logarithmic distribution information which is based on the signals, and means for providing location information for at least one of the lightning strikes based on the logarithmic distribution information.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

The present invention will now be described in detail with reference to the drawings wherein like reference labels are used to refer to like elements throughout. The present invention is designed to detect the electro-magnetic fields associated with individual lightning strikes and to process the information obtained from such fields in order to map the location of the lightning strikes. The system initially processes single-strike data to develop a gross range and bearing estimate describing the location of each lightning strike. The system then categorizes the information of each lightning strike into a predefined bearing bin as a function of the bearing estimate. In addition, the system calculates the logarithmic distribution of the range estimates associated with each bearing bin by calculating the logarithm of the range estimates. Based on the logarithmic distribution, the system performs range compression by clustering the range estimates in logarithmic space to identify and to locate active thunderstorm cells.

More specifically, the system according to the present invention utilizes what has been discovered to be a logarithmic-normal (hereinafter "log-normal") distribution relationship in lightning strikes in order to increase ranging accuracy. The inventor has discovered that an active lightning cell at a fixed range to a sensor generates a number of lightning strikes whose amplitudes tend to be log-normal distributed. The system uses this information to cluster the lightning strike information in active cells within respective bearing bins. In particular, new lightning strikes which are determined to originate from an existing active cell are identified as being located at a range corresponding to either the mean or median range of the log-normal distribution of the lightning strikes in the particular active cell.

In this manner, the single-strike lightning strike data is clustered (e.g., compressed) in logarithmic space into active cells having a range corresponding to the mean or median of the logarithmic distribution within the active cell. Thus, the range estimates of the respective lightning strikes in a given active cell tend to converge on the mean or median range to pinpoint the center of the active cell. This information is then displayed so as to show well-defined active thunderstorm cells and/or is otherwise utilized for thunderstorm tracking, etc.

Figure 1A:
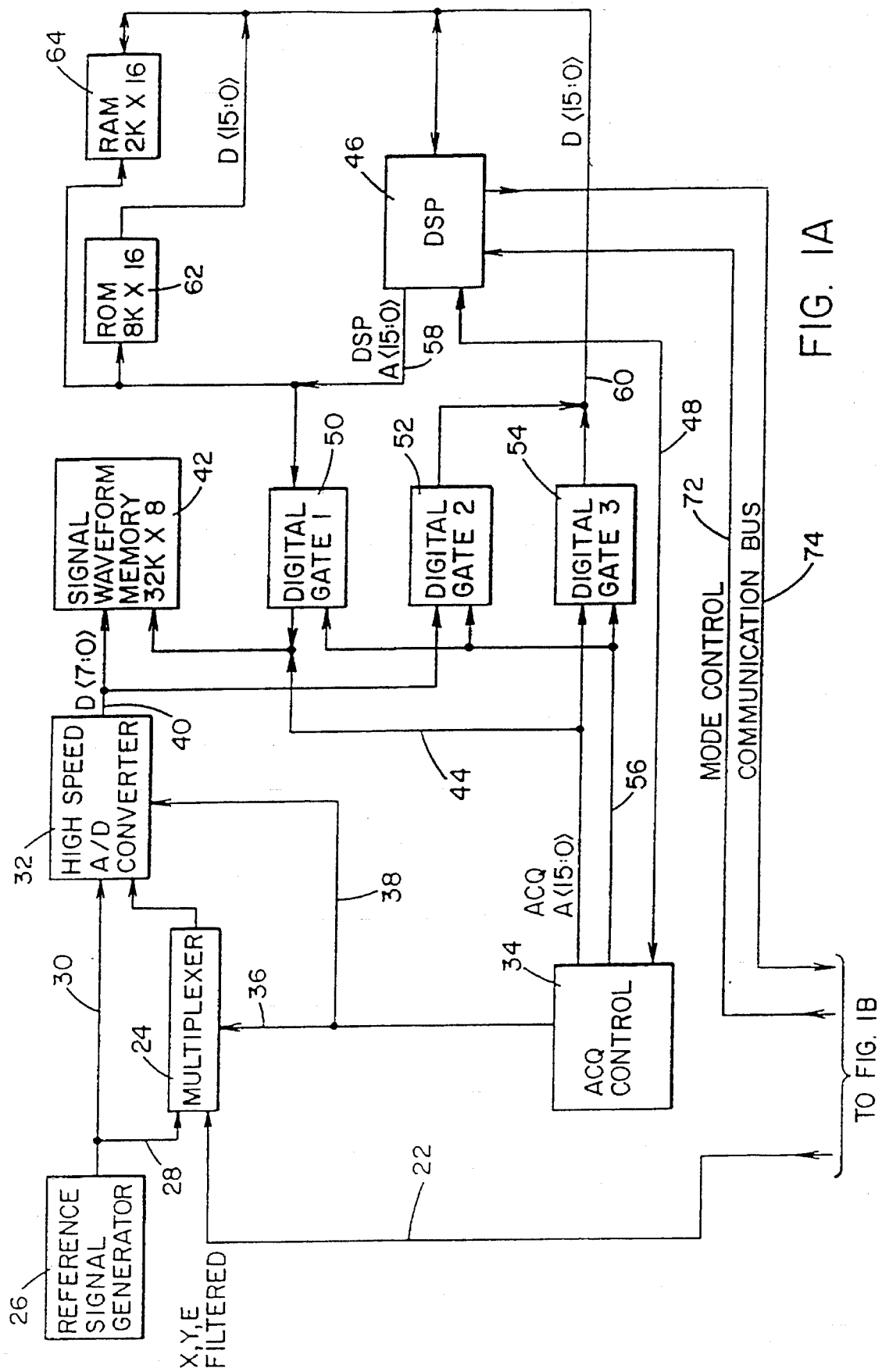
FIGS. 1A and 1B represent a functional block diagram schematic of a lightning strike detection and mapping system suitable for embodying the principles of the present invention.
Figure 1B:
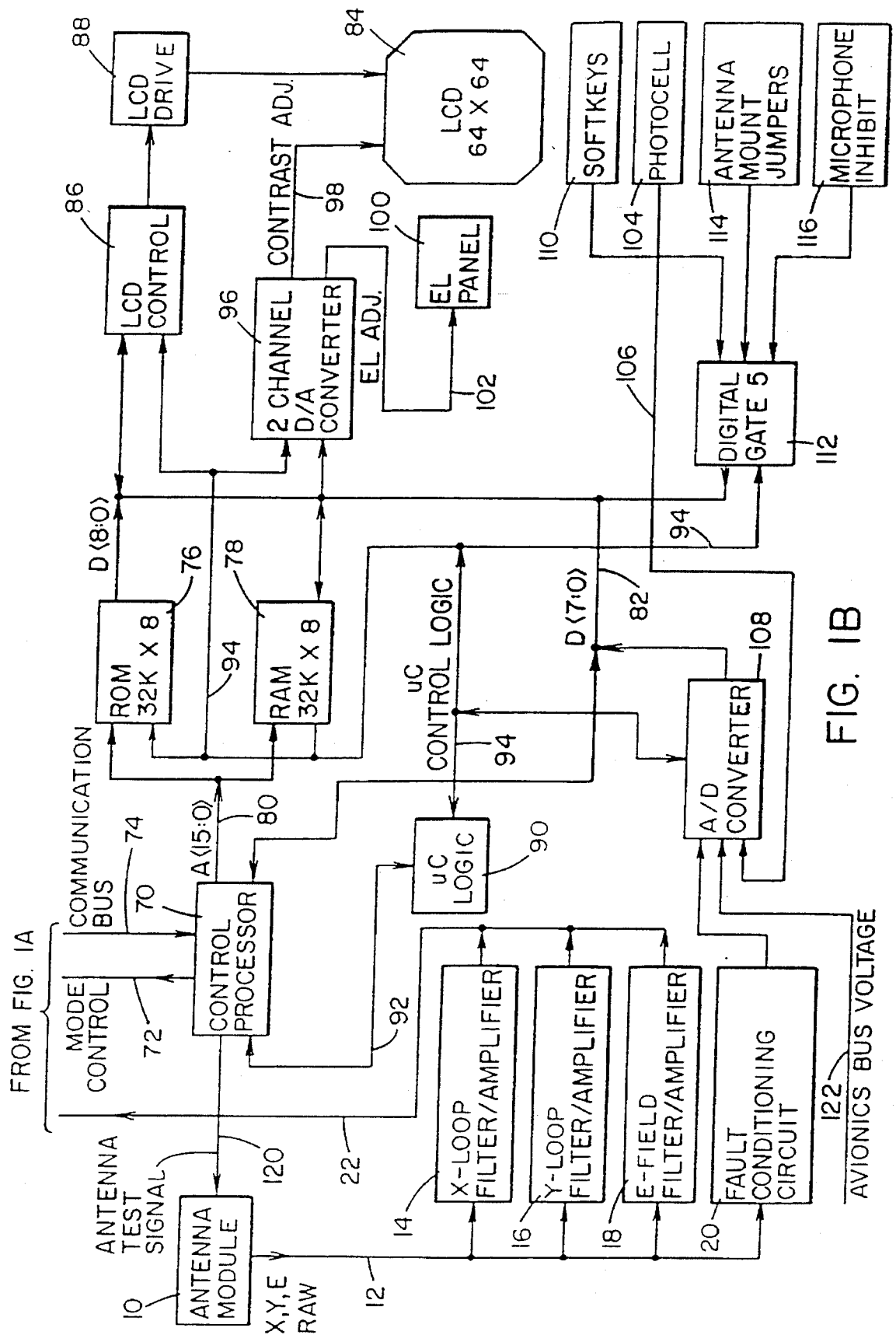

Referring now to FIGS. 1A and 1B, a functional block diagram of a lightning strike detection and mapping system suitable for embodying the principles of the present invention is shown. Referring specifically to FIG. 1B, an antenna module 10 includes a conventional crossed loop antenna for sensing and receiving the magnetic field radiated from a lightning strike. The module 10 includes conditioning circuits coupled to the loop antenna for generating signal waveforms denoted as X and Y representative of the received components of the magnetic field. In the present embodiment, the X and Y signals are substantially orthogonal. Further, the antenna module 10 includes a sense antenna which may be non-directional for sensing and receiving an electrical field radiated from a lightning strike and conditioning circuitry coupled to the sense antenna for generating a signal waveform E representative of the received electric field.

The generated signals X, Y and E are provided over a path 12 to respective filter/amplifiers 14, 16 and 18 for the further conditioning thereof. The three signals X, Y and E are also provided to a fault conditioning circuit 20. The conditioned X, Y and E signals are provided over a path 22 to respective inputs of a multiplexer 24. In addition, a reference signal generator 26 generates one reference signal over path 28 to another input of the multiplexer 24 and another reference signal over path 30 to a reference signal input of a high speed analog-to-digital A/D converter 32.

A data acquisition (ACQ) control block 34 controls the sampling of the X, Y and E signal waveforms and the reference signal by the path 36 and controls the digitizing thereof by the converter 32 with signals over the path 38. In the present embodiment, the digitized samples are generated as a train of data samples provided at a rate of 333 kilosamples per second and corresponding to and representative of each of the X, Y and E signal waveforms and conducted over an 8 bit data bus 40 to a signal waveform memory 42 for storage therein. The ACQ control block 34 addresses the memory 42 utilizing an address bus 44 to designate the storage register of each of the digitized data samples.

The ACQ control block 34 coordinates its operational activities with a programmed digital signal processor (DSP) 46 utilizing bi-directional signal lines 48. The ACQ control block 34 also governs the operation of three digital gates 50, 52 and 54 by the signals over path 56. In the present embodiment, the DSP 46 is capable of addressing the memory 42 using its address bus 58 via gate 50 and also of reading the contents of the addressed storage register of memory 42 over a portion of its data bus 60 via gate 52. The DSP 46 is also capable of reading the ACQ address bus 44 over its data bus 60 via gate 54. The digital signal processing section further includes a read only memory (ROM) module 62 and a random access memory (RAM) module 64 both of which are coupled to the DSP 46 over the address and data busses 58 and 60, respectively. In this embodiment, the DSP 46 processes the data samples of the sampled-data waveform trains to detect a lightning strike and estimates a location thereof for a mapping process as will be described in more detail below.

Further in the present embodiment, the operations of the DSP 46 are controlled to a large extent by a programmed control processor or microcontroller 70 utilizing signal lines over a path 72 connecting the processor 70 and DSP 46. In addition, processed data, like the location of the detected lightning strike with respect to an observation location, for example, is provided from the DSP 46 to the control processor 70 over a communication bus 74 coupling the two units. The control processing section also includes a read only (ROM) memory 76 and a random access (RAM) memory 78 which are coupled to the control processor 70 through an address bus 80 and a data bus 82.

The control processor or microcontroller 70 is programmed to drive a display unit 84 from the data bus 82 utilizing a control block 86 and drive block 88 both of which may be part of the display module 84. In the present embodiment, the display module 84 is a liquid crystal display (LCD) having on the order of a 64 by 64 pixel array.

An ancillary logic block 90 coordinates operational activities with the control processor 70 utilizing a bi-directional signal path 92 to generate and receive logic signals over a bi-directional path 94 which is coupled to the various modules of the control processing section, like the memories 76 and 78 for enabling and controlling read and write operations, for example. The signal path 94 is also coupled to the control block 86 to enable and control the operations thereof as well.

The control processor 70 is also capable of controlling the brightness and contrast of the display module 84 utilizing a two channel digital-to-analog (D/A) converter 96 which is coupled to the processor 70 through the data bus 82. The enabling and control of the converter 96 is provided by signals over path 94. One output signal of the converter 96 governs the contrast of the display unit 84 over path 98 and the other signal adjusts brightness of a back panel light module 100 of the display module 84 over path 102. A photocell 104 disposed in close proximity to the display unit 84 measures ambient light conditions and generates a signal over path 106 representative thereof. The control processor 70 is capable of reading the signal 106 through an analog-to-digital (A/D) converter 108 and the data bus 82. Once again, the signals of the path 94 enable and operate the converter 108.

Still further, operator interface pushbuttons referred to as softkeys and designated by block 110 may be read by the control processor 70 through a digital gate 112 and the data bus 82. The gate 112 also permits reading of other digital signals, like antenna mount jumpers designated by the block 114 and a microphone inhibit signal designated by the block 116, for example. Similarly, the gate 112 is enabled and controlled by the logic signals of path 94.

Finally, the control processor 70 is capable of generating an antenna test signal over path 120 to the antenna module 10 for testing the X, Y and E receiving circuits thereof. Resultant test signals of the X, Y and E circuits are conducted over the path 12 and through the conditioning circuit 20 to the A/D converter 108 for reading by the control processor 70 via the data bus 82. Still further, the control processor 70 is capable of monitoring the power source of the system by reading the bus voltage thereof over path 122 utilizing A/D the converter 108 and data bus 82.

The foregoing description of the functional block embodiment of FIGS. 1A and 1B is provided merely as an overview of the lightning strike system. A more detailed description of the features and components of the lightning strike system of FIGS. 1A and 1B and the operation thereof is found in U.S. Pat. No. 5,295,071, issued on Mar. 15, 1994, and in U.S. Pat. No. 5,295,072, also issued on Mar. 15, 1994, the entire disclosures of which are both incorporated herein by reference. Moreover, also incorporated herein by reference is the entire disclosure of commonly assigned U.S. patent app. Ser. No. 08/274,924, filed on Jul. 13, 1994, and entitled "Lightning Strike Detection and Mapping System."

These patents and the patent application describe methods of operating of the system shown in FIG. 1 to obtain a range estimate and bearing estimate for each detected lightning strike, i.e., single-strike data. Generally speaking, the X, Y and E components of the received signals are processed to provide a range estimate and bearing estimate of the detected lightning strike based on the peak current amplitudes thereof. It will be appreciated that the system operation and hardware of the present invention is generally identical in substantive respect to that of the systems described in the above-identified '071 and '072 patents and the patent application except as otherwise noted herein.

The system according to the present invention is unique in that it also performs statistically-based processing on the single-strike data by the DSP 46 and the processor 70. The single-strike range estimate and bearing estimate data is initially obtained, for example, using any of the particular methods described in the aforementioned patents and patent application. As a result, further details as to how the single-strike range estimate and bearing estimate data for each lightning strike is initially obtained have been omitted herein. The following description focusses predominantly on the additional statistically-based processing performed on the single-strike data to improve ranging accuracy. In fact, it will be appreciated that various other methods for initially obtaining single-strike range estimates and bearing estimates can be used in the alternative without departing from the scope of the invention.

Figure 2:
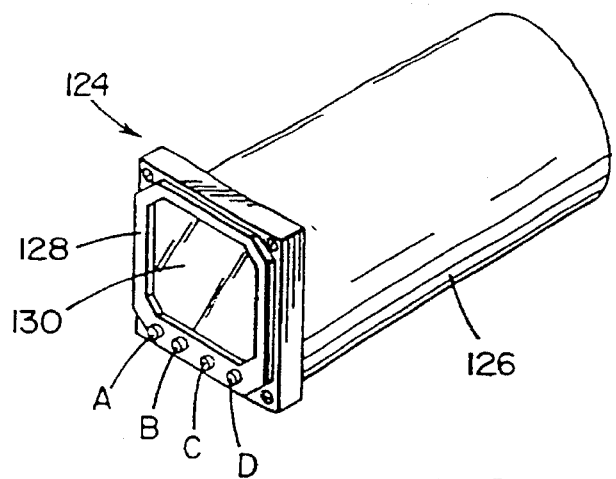
FIG. 2 is an illustration of an exemplary physical embodiment of the preferred system which depicts the display module and the electronic processing section enclosure thereof.

Referring briefly to FIG. 2, an illustration of an exemplary physical embodiment of the preferred system shows the display module depicted at 124 and the electronic processing section enclosed within an enclosure depicted at 126. Four softkeys or pushbuttons A, B, C and D are disposed at the bottom of the display section 124 within a bezel mount 128 surrounding the a panel LCD unit 130. The photocell or ambient light measuring instrument may be disposed in close proximity to the display 130 like, for example, in the bezel 128 thereof.

Figure 3:
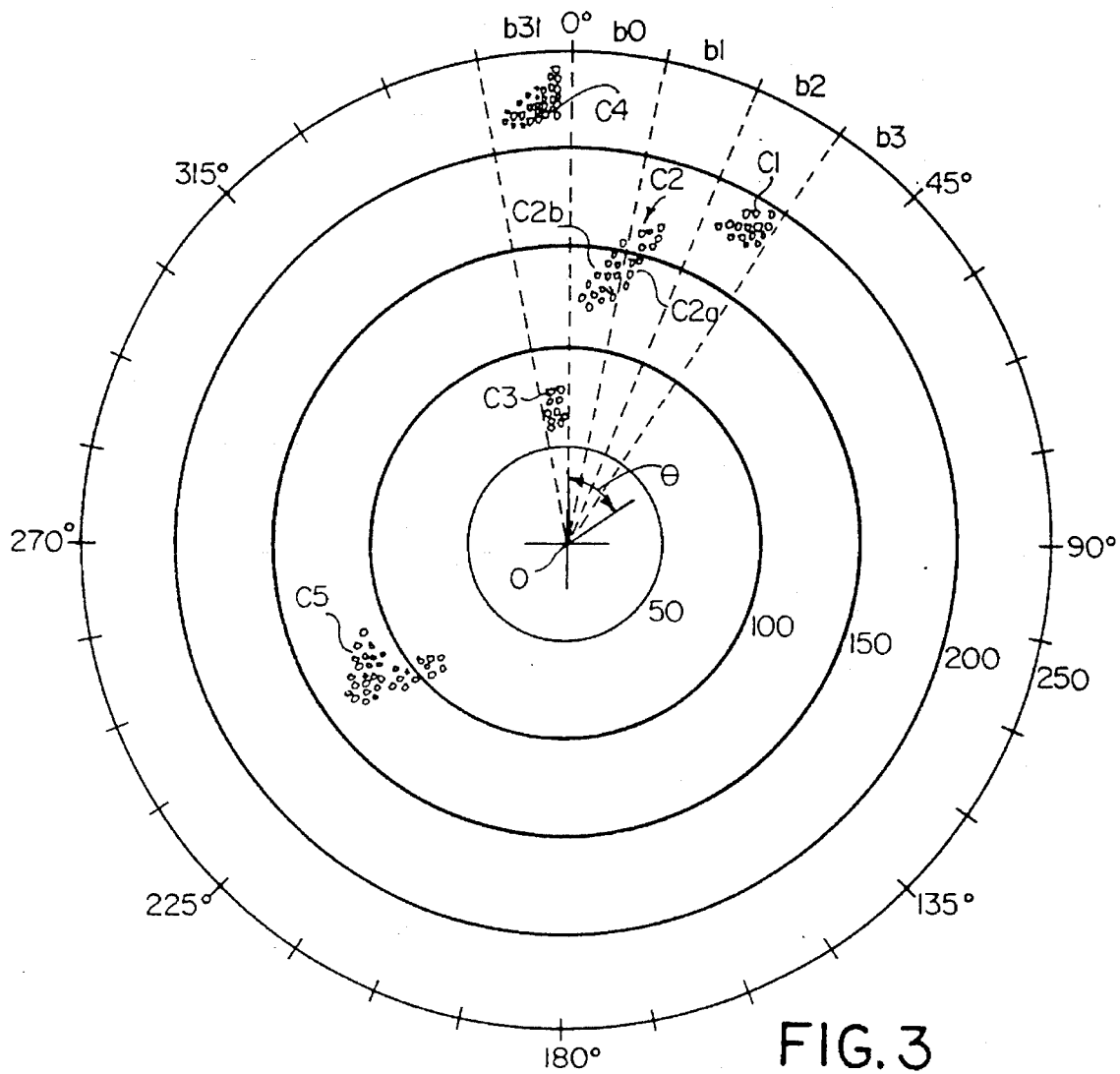
FIG. 3 is a representation of an illustrative display produced by the system of FIGS. 1A and 1B.
Figure 7:
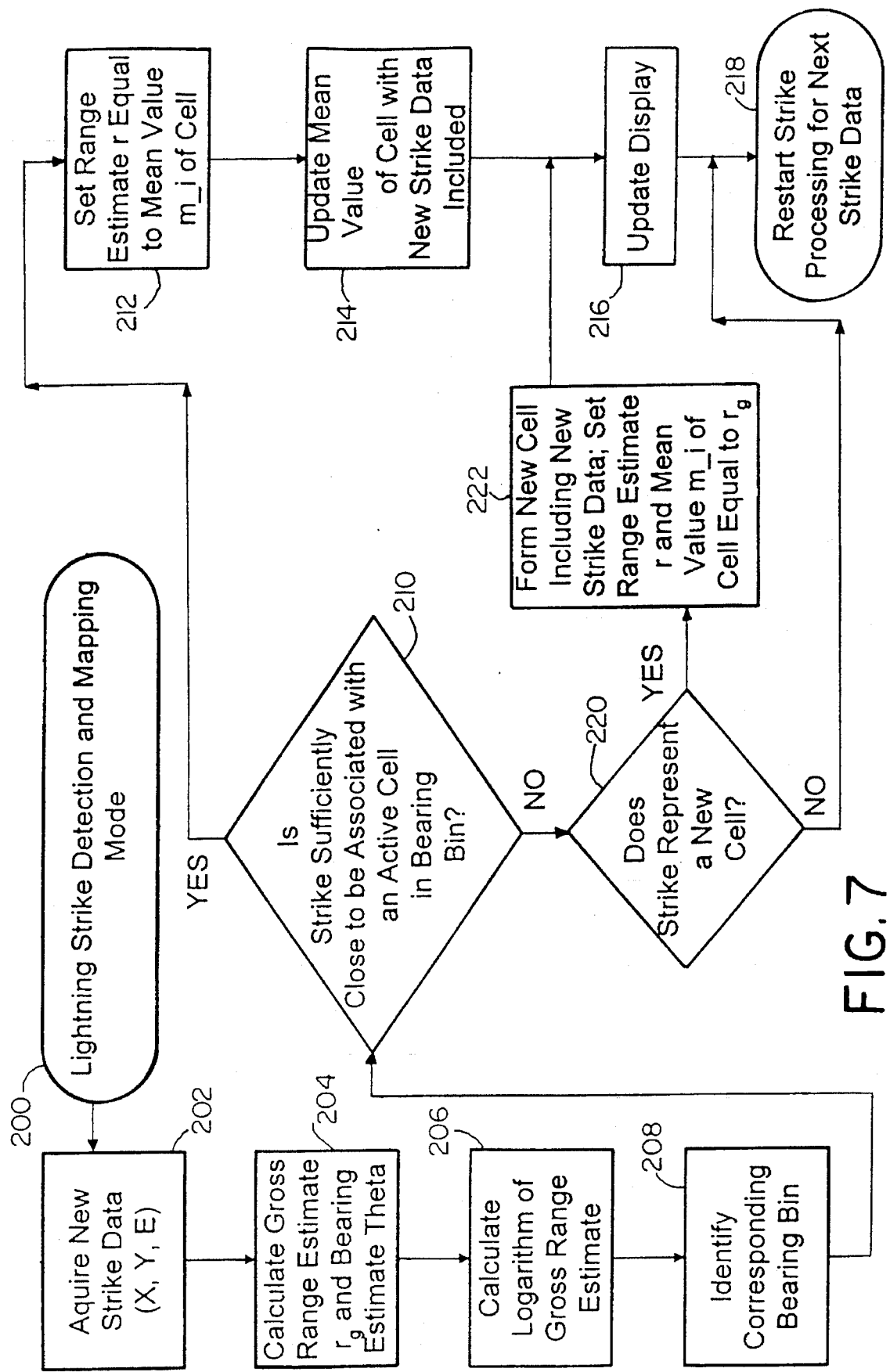
FIG. 7 is a software flow chart suitable for programming the system shown in FIGS. 1A and 1B to operate in a lightning strike detection and mapping mode in accordance with the present invention.

FIG. 3 shows an example of a screen display generated on the LCD unit 130 by the software routine of FIG. 7 in accordance with the present invention. In the preferred embodiment, the system provides full 360° lightning strike detection and mapping. The origin O of the display represents the location of the sensor, e.g., the antenna module 10 of FIG. 1B. Concentric circles formed about the origin O serve as reference indicators for ranges r equal to 50, 100, 150, 200 and 250 nautical miles (nm) from the sensor, respectively, as indicated. The bearing angle θ indicates the angle of the lightning strike relative to a reference axis and can be equal to any angle between 0° and 360°. The microcontroller 70 is programmed to cause the lightning strike data processed by the system to be displayed on the LCD unit 130 at the corresponding range estimate r and bearing estimate θ. Since the system clusters the lightning strike estimates based on the location of the active cell from which the lightning strikes originate, the system produces a display which clearly identifies the location of each thunderstorm cell by a well-defined cluster of lightning strikes.

In the preferred embodiment, the display is nominally divided into n bearing bins $b_0$ to $b_{n-1}$, with each bearing bin representing a 360/n degree section as shown. For the exemplary embodiment, n is equal to 32 and bearing bins $b_0$ to $b_{31}$ are equal to (360/32)° sections. Thus, bearing bin $b_0$ includes the section defined by θ=0 to 11.25 degrees, bearing bin $b_1$ includes the section defined by θ=11.25 to 22.5 degrees, bearing bin $b_2$ includes the section defined by θ=22.5 to 33.75 degrees, etc.

Active thunderstorm cells appear on the display as clusters of darkened pixels on a backlit screen. For sake of example, FIG. 3 shows active cells C1–C5 as being detected within the range of the system at a given moment in time. Bearing bin $b_2$ includes active cell C1 having a range centered at about 190 nm from the origin O. Active cell C2 is actually formed by active cell C2a located in bearing bin $b_1$ and active cell C2b located in bearing bin $b_0$. The active cells C2a and C2b have ranges centered at approximately 150 nm and 140 nm, respectively. Bearing bin $b_{31}$ includes active cells C3 and C4 the ranges of which are centered at approximately 65 nm and 230 nm, respectively.

Underlying Theory

The range estimates for the active cells as displayed by the system in FIG. 3 are based on a statistical analysis of the lightning strikes associated with the respective active cells. In order to provide a better understanding as to how the lightning detection and mapping system generates a display such as that shown in FIG. 3, a brief description of the theory which underlies the statistical analysis will be provided. First, it will be appreciated the amplitude of a lightning strike can be considered as a random variable with an associated probability density function (pdf). Second, it will be appreciated that the pdf can be characterized and that characterization can be used to provide a statistical method for lightning ranging.

An active thunderstorm cell at a fixed range r from a sensor generates strikes with a random amplitude. In the majority of cases, the estimated range for a given strike is proportional to the inverse of the amplitude. Consequently, the error in the range estimate is also a random variable. By characterizing the amplitude probability density function of the lightning cell, the range estimate probability density function is also characterized. As will be explained in more detail below, it has been discovered that the amplitude tends to be log-normal distributed and that the range estimate is also log-normal distributed. The mean and standard deviation of random variables such as these can be computed. The standard deviation of the range estimate is, in some sense, a lower bound to the error produced by any single-strike processing algorithm using amplitude-based ranging.

Figure 4:
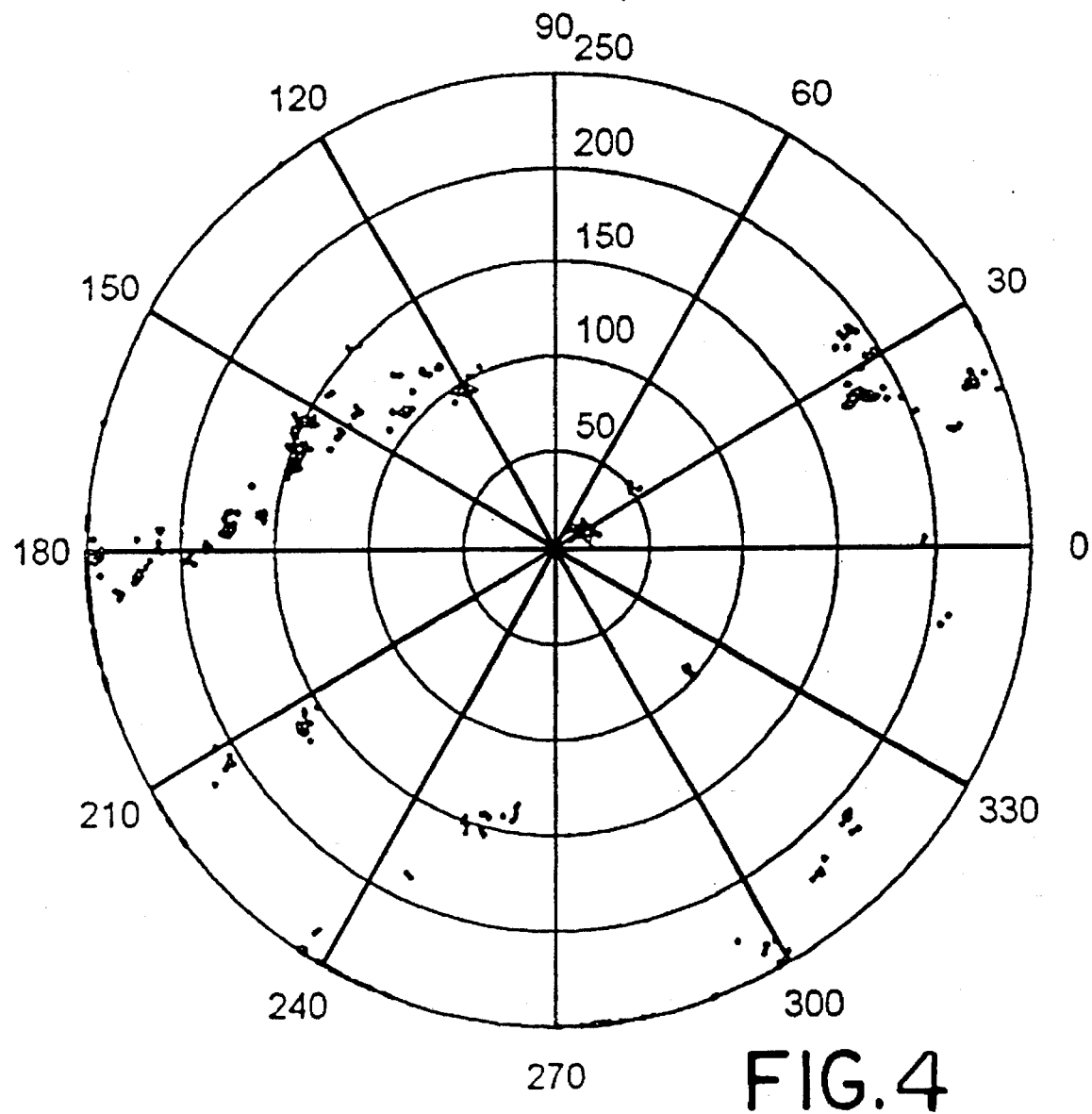
FIG. 4 is a plot of lightning strike data acquired over a four-minute interval using conventional triangulation techniques.
Figure 5:
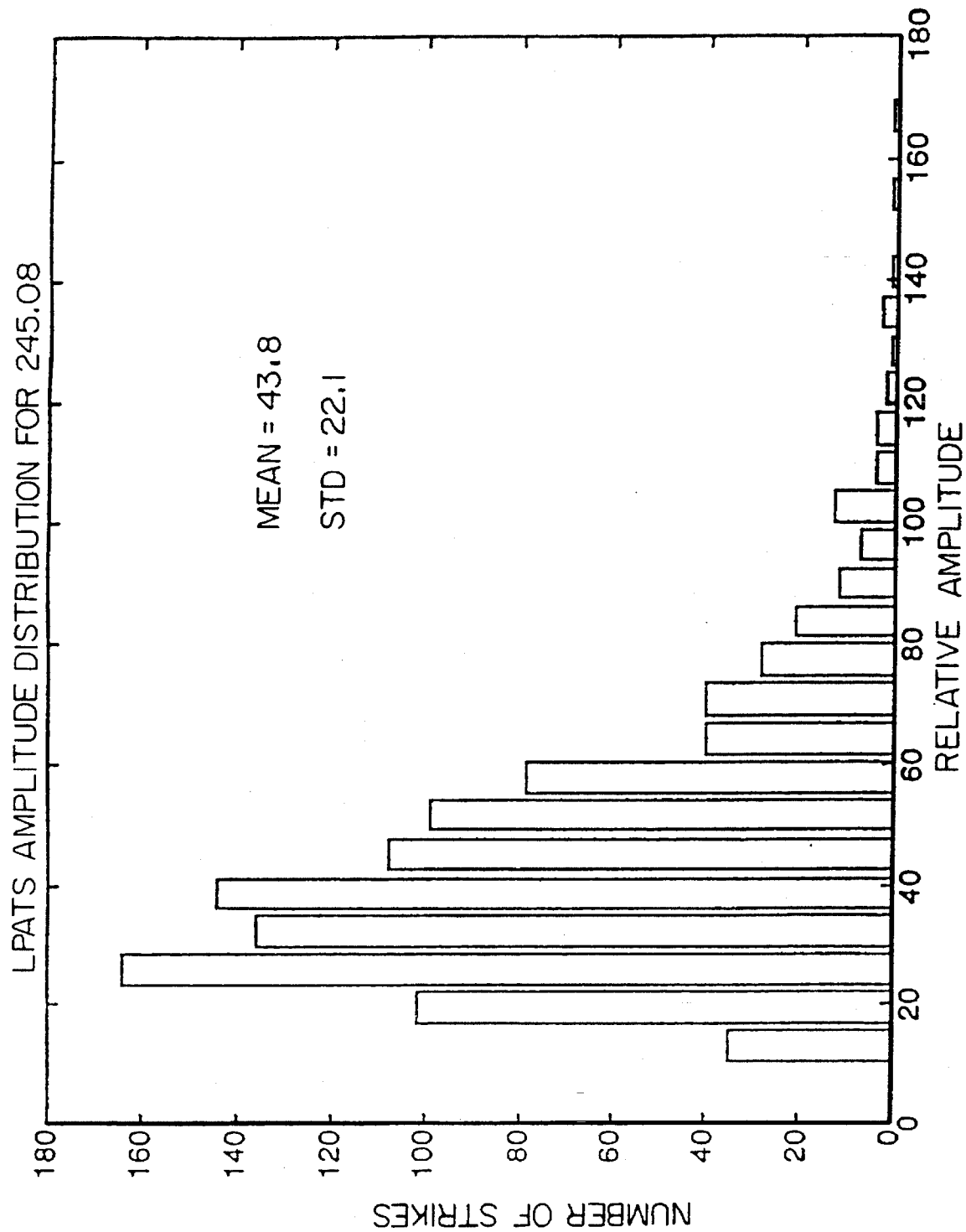
FIG. 5 is an amplitude histogram of the lightning strikes shown in FIG. 4.

These statistical properties can be shown by way of example. FIG. 4 shows a map of lightning strikes over approximately a four minute interval based on exemplary LPATS triangulation-based archived data now commercially available from GeoMet Data Services, Tuscon, Ariz. The LPATS data incorporates data for approximately 1100 strikes. There are several isolated and relatively distant active cells or storms (most over 150 nm away) shown in FIG. 4. There is one close storm at about θ=30° and r=20 nm. FIG. 5 shows a histogram of the peak current amplitudes of the measured LPATS strikes shown in FIG. 4. Since LPATS uses triangulation to obtain the lightning strike data, the LPATS system is able to compute the strike range r without relying on the amplitude of the measured strike signals (e.g., the X, Y and E components). The amplitude for each strike as represented in FIG. 5 can be obtained from the signal strength and known range to the strike as will be appreciated.

Figure 6:
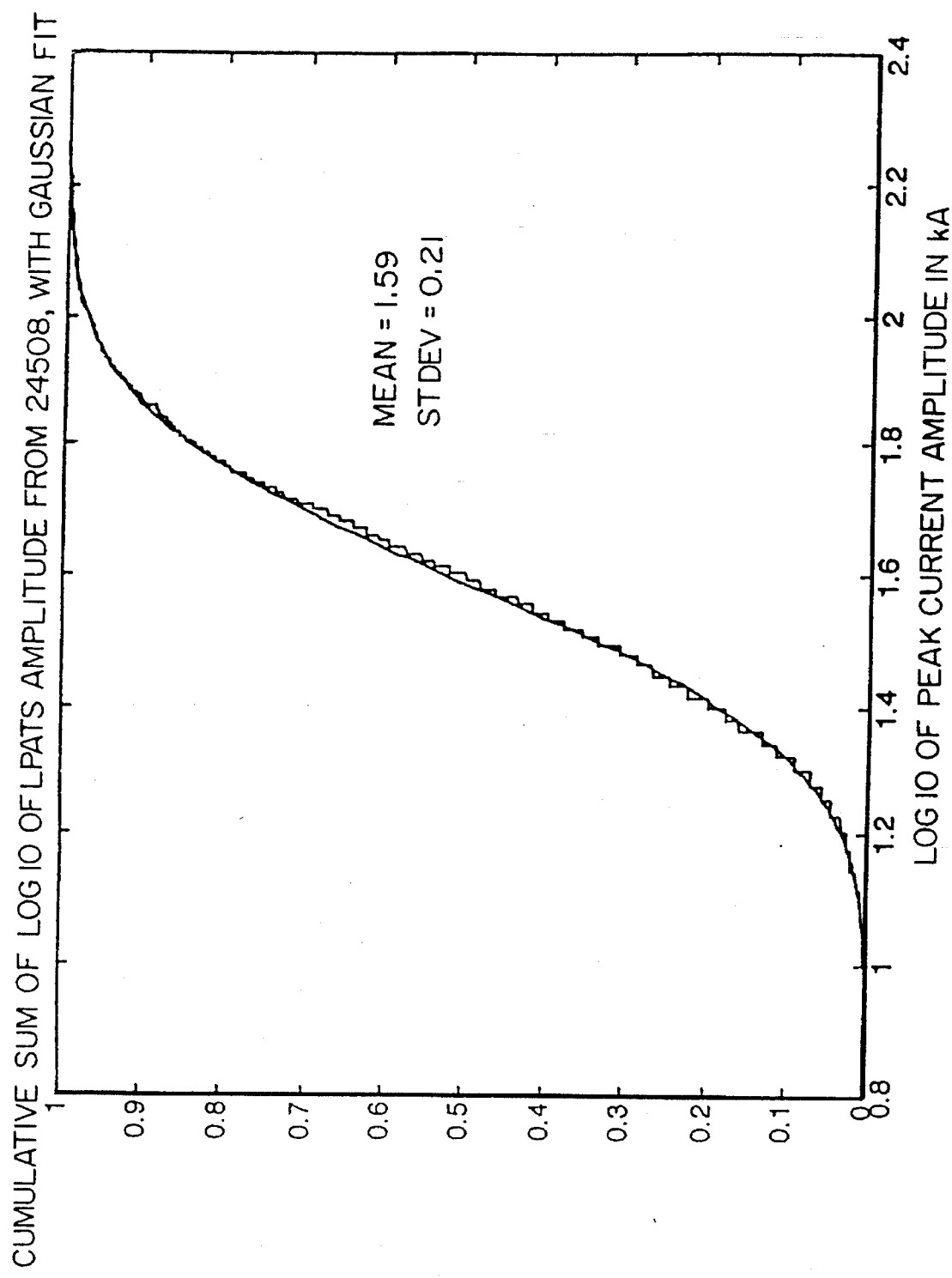
FIG. 6 is a plot of the cumulative sum of the $\log_{10}$ amplitudes of the strike data shown in FIG. 4 with a curve overlayed thereon representing a cumulative distribution of a Gaussian curve having the same mean and standard deviation as the cumulative sum of the $\log_{10}$ amplitudes.

As can be seen from FIG. 5, the amplitude histogram of the lightning strike data resembles that of a log-normal distribution. In particular, the logarithm of the amplitude data is normal, i.e., Gaussian. This observation is verified in FIG. 6 which shows a comparison between the cumulative distribution function of a Gaussian curve overlayed with a cumulative distribution of the base 10 logarithm of the amplitude estimates from the LPATS data. More specifically, the abscissa in FIG. 6 represents the base 10 logarithm ($\log_{10}$) of the peak current amplitude estimate in kiloamps (kA) for each lightning strike in the LPATS data. The ordinate represents the normalized cumulative sum of the $\log_{10}$ of the amplitudes for the respective lightning strikes in the LPATS data. The stepped curve in FIG. 6 represents the plot of the $\log_{10}$ LPATS measured amplitude data, and the smooth curve is the cumulative distribution of a fitted Gaussian curve. The mean and standard deviation of the Gaussian curve are set equal, i.e., fitted, to the mean and standard deviation of the log-amplitude data. As can be seen, the agreement between the measured and fitted curves is very close.

It is noted that the mean of the log-amplitude LPATS data is 1.59, so the mean of the amplitude data is about 38.9 kiloamperes (kA). The standard deviation of the log-amplitude data is 0.21. It will be appreciated that the use of a logarithm to another base value, such as $\log_e$, can be used in a different embodiment without departing from the scope of the invention. The present invention contemplates the use of $\log_{10}$ and $\log_e$ interchangeably.

FIGS. 5 and 6 indicate therefore that the peak current amplitudes of lightning strikes tend to be log-normal in distribution. Therefore, it is concluded that a thunderstorm cell which is at a fixed range to a sensor will generate a number of strikes whose amplitudes are log-normal distributed. It is also concluded based on conventional theory that the range of the thunderstorm is proportional to the inverse of the amplitude of the received strike waveform. Thus, if the amplitude A of the lightning strike is log-normal, then a range estimate $r=k/A$, where k is a constant, is log-normal. Furthermore, the base 10 logarithm of the range, i.e., $\log_{10}(r)$, will have the same standard deviation as the base 10 logarithm of the amplitude, i.e., $\log_{10}(A)$.

System Operation

Turning now to FIG. 7, a software flowchart is provided according to which the system shown in FIGS. 1A and 1B is programmed to perform lightning range compression based on the above-described statistical theory.

Beginning at block 200 in FIG. 7, the system enters a lightning strike detection and mapping mode. This mode is entered in response to a user input, for example. In block 202, the system detects and acquires single-strike data for a new lightning strike. The single-strike data may include, for example, the X, Y and E signal components based on the peak current amplitude of the lightning strike as provided over path 22 in FIG. 1A. Next, in block 204 the DSP 46 (FIG. 1A) processes the single-strike data to calculate a gross range estimate $r_g$ and bearing estimate $\theta$. The specific processing carried out in block 204 for determining the gross range estimate $r_g$ and bearing estimate $\theta$ can be based on any of the methods disclosed in the above-referenced U.S. Pat. Nos. 5,295,071 and 5,295,072, or in the above-identified U.S. patent app. Ser. No. 08/274,924. Even more generally, the gross range estimate $r_g$ and bearing estimate $\theta$ can be determined in block 204 based on the following basic equations for single-strike data:

$$r_g = k/A$$

and $$\theta = \arctan X/Y,$$

where k is a known constant (determined for example by sensor calibration) and A represents the current amplitude of the lightning strike.

In block 206, the DSP 46 calculates the logarithm of the gross range estimate $r_g$. In the exemplary embodiment logarithms to the base 10 are utilized, although it will be appreciated that other logarithms such as the natural logarithm could be used in another embodiment without departing from the scope of the invention. Next, in block 208 the DSP 46 classifies the lightning strike into the appropriate bearing bin $b_0$ thru $b_{31}$ (FIG. 3) based on the bearing estimate $\theta$. For example, if the single-strike bearing estimate $\theta$ provided in block 204 is equal to 5°, the lightning strike is classified into bearing bin $b_0$. If the bearing estimate $\theta$ is equal to 350°, for example, the lightning strike is classified into bearing bin $b_{31}$, and so on.

Figure 8A:
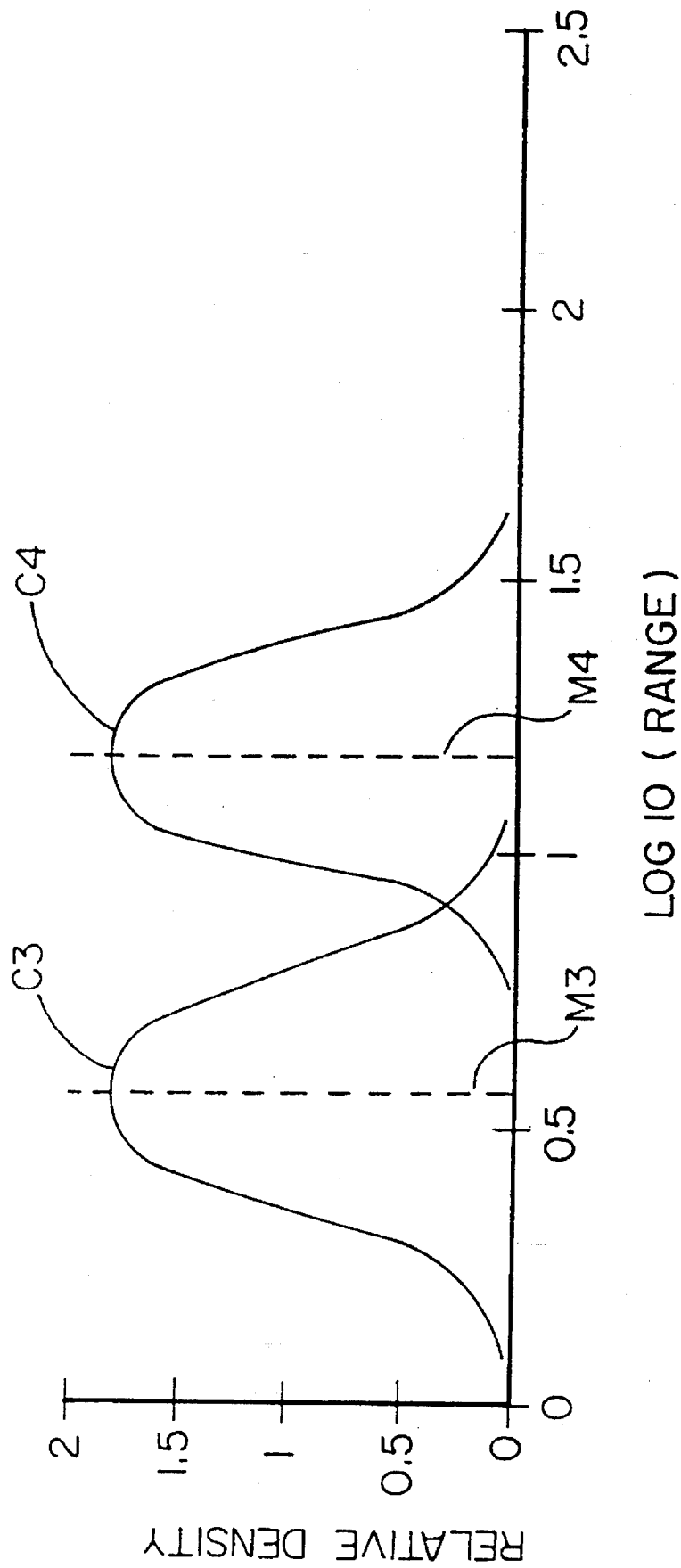
FIG. 8A is a plot of the strike data density representing two active cells in an exemplary bearing bin in accordance with the present invention.

In block 210, the DSP 46 determines if the detected lightning strike can be associated with an active cell within the bearing bin identified in block 208. As will be appreciated, each active cell in a given bearing bin is identified by the mean of the logarithmic distribution of the strike amplitudes of the strikes included in that cell. The DSP 46 in cooperation with the microcontroller 70 stores the strike data for the detected lighting strikes in a system memory such as RAM 64 or RAM 78 (which are sized accordingly). The strike data is partitioned within the memory in accordance with the respective bearing bins $b_0$ thru $b_{31}$ identified in block 208. The DSP 46 is programmed to calculate the $\log_{10}$ distribution of the range data for the strikes associated with each cell in the respective bearing bins and to identify the mean or median of the $\log_{10}$ data in each cell. The logarithmic distribution indicates the frequency or density at which the $\log_{10}$ of the range estimates occur in a respective cell. To facilitate calculation of the logarithmic distribution of each active cell, the lightning strike data is labelled and stored in system memory with a tag identifying the particular active cell with which the strike is associated as determined in blocks 210 and 222 discussed below. FIG. 8A shows the $\log_{10}$ distribution representing the density of the lightning strike range data for bearing bin b31 of FIG. 3. The lightning strike data associated with active cell C3 has a log-normal distribution with a mean at m3, and the lightning strike range data associated with active cell C4 has a log-normal distribution with a mean at m4. The mean for each cell can be identified, for example, by detecting the peaks of the density curves. The standard deviation of each cell is assumed to be a fixed, known value $\sigma$. In the case where the gross range estimates are based on the detected peak currents, $\sigma$ is set equal to 0.21 as determined by the analysis of the LPATS data presented above.

In order to determine whether the current detected lightning strike can be associated with an active cell in block 210, the distances of the current detected lightning strike to each cell within the same bearing bin is computed by the DSP 46 as follows:

$$d_i = abs(lr_{in} - m_i)/\sigma_i$$

where "abs" represents the absolute value operator; "$lr_{in}$" is equal to the $\log_{10}$ of the gross range estimate $r_g$ determined in block 206; and "$m_i$" and "$\sigma_i$" represent the mean and standard deviation, respectively, for the ith active cell in the bearing bin.

The value of $d_i$ with respect to each active cell is in units of standard deviation. The DSP 46 determines the minimum value of $d_i$ with respect to each active cell in block 210 and the active cell corresponding to the minimum value of $d_i$, i.e., the active cell closest to the current strike, is thereby identified. The DSP 46 then applies one or more predefined criteria to determine if the current lightning strike is in fact sufficiently close to be associated with that particular active cell identified as the closest. Generally speaking, the current lightning strike is considered sufficiently close to the active cell provided the distance $d_i$ is sufficiently small to have confidence that the strike could come from a cell with a range represented by the mean $m_i$. For a log-normal distribution, approximately 5% of strikes in a given cell will be a distance $d_i > 2$ from the mean, and approximately 0.5% will be a distance $d_i > 3$ from the mean. Therefore, a threshold value preferably within the range of $d_t=2$ to 3 is used to identify whether a lightning strike is sufficiently close to be associated with an active cell. In other words, if the DSP 46 determines that the current lightning strike has a gross range estimate $r_g$ having a $\log_{10}$ which is within at least 2 or 3 standard deviations of the logarithmic mean of the closest existing active cell in the bearing bin, the current lightning strike data is associated with that particular active cell in block 210. It is noted that using a threshold of greater than 3 standard deviations will tend to result in the creation of one large cell in the bearing bin, whereas using a threshold less than 2 standard deviations will tend to result in many small cells being created within the bearing bin.

While the present embodiment uses the mean for $M_i$ and standard deviation for $sigma_i$, it will be appreciated that other measures of the center and spread of the distribution could be used without departing from the scope of the invention. For example, two measures that could be used in place of the mean are 1) the median, and 2) the midpoint between the 25% and 75% cumulative distribution points of the comulative distribution function. Similarly, the distance between the 25% and 75% cumulative distribution points, appropriately scaled, can replace standard deviation for $sigma_i$. The values 25% and 75% can be changed to other values as well without departing from the scope of the invention.

Provided the lightning strike data is sufficiently close to be associated with an active cell in block 210, the system proceeds to block 212 in which the gross range estimate $r_g$ is improved upon by calculating a refined range estimate $r$. Specifically, the range estimate $r$ for the lightning strike is set equal to the range represented by the logarithmic mean $m_i$ for that cell, i.e., $r=10^{m_i}$, thereby effectively compressing the gross range estimate data. Next, in block 214 the mean for that cell is updated based on the logarithms of compressed range estimates of the previously detected lightning strikes stored in system memory and the gross range estimate $r_g$ of the new strike, and the updated mean and compressed cell data for all the lightning strikes in that cell are then stored in system memory. The system then proceeds to block 216 in which the display 130 (FIG. 2) is updated so as to include information based on the newly detected lightning strike. This can include a display of the lightning strike similar to that shown in FIG. 3 with the newly detected strike shown at its respective bearing estimate $\theta$ and compressed range estimate $r$. The system may also display the location of the center of the active cell based on the updated mean value calculated in 214 and, for example, the average bearing of all the lightning strikes associated with the cell. The center of the cell can be shown by an "X" or some other indicator on the display. The system then continues to block 218 in which the system repeats the process shown in FIG. 7 for the next detected lightning strike.

EXAMPLE

Suppose an active cell has four lightning strikes L1–L4 associated therewith when subsequently a fifth lightning strike L5 belonging to the cell is detected, e.g., in block 202 of FIG. 7. Prior to compression, the data associated with the cell is as follows:

| Lightning Strike | Range Estimate $r$ ($\log_{10}$) | Gross Range Estimate $r_g$ ($\log_{10}$) | Cell Mean ($\log_{10}$) |
|---|---|---|---|
| L1 | 1.20 | X | |
| L2 | 1.30 | X | |
| L3 | 1.25 | X | 1.220* |
| L4 | 1.20 | X | |
| L5 | x | 1.28 | |

*Note that the $\log_{10}$ cell mean is not equal exactly to the mean of the $\log_{10}$ ranges of strikes L1–L4 as the cell mean was calculated using the gross range estimate $r_g$ for the last strike added to the cell (block 214 of FIG. 7). "X" denotes not applicable.

After compression, the estimated range $r$ of strike L5 has been set equal to the cell mean (block 212) e.g., $r=1.22$, and the cell mean is then updated using the gross range estimate $r_g$ of strike L5 (block 214), thereby resulting in the following:

| Lightning Strike | Range Estimate $r$ ($\log_{10}$) | Gross Range Estimate $r_g$ ($\log_{10}$) | Cell Mean ($\log_{10}$) |
|---|---|---|---|
| L1 | 1.20 | X | |
| L2 | 1.30 | X | |
| L3 | 1.25 | X | 1.232 |
| L4 | 1.20 | X | |
| L5 | 1.22 | X | |

If in block 210 the current detected lightning strike is determined not to be sufficiently close to an existing active cell in the bearing bin identified in block 208, or if no active cells exist in the bearing bin, the system proceeds to block 220. In block 220, the system determines whether the current detected lightning strike represents a new active cell based on a predetermined criteria. The precise criteria for determining whether a new active cell exists can include any of a number of different tests. The following are two examples for determining whether the detected lightning strike represents a new cell.

According to a first criterion, the DSP 46 accepts any strike in block 220 as representing a new cell. It is noted that this will result in there being no suppression of the strike data and will tend to lead to the generation of numerous active cells. The system proceeds to block 222 in which the DSP 46 creates a new cell including the current detected strike with an estimated range $r$ equal to the gross range estimate $r_g$ and sets the logarithmic mean of the new cell to correspond to the gross range estimate $r_g$, i.e., equal to the $\log_{10}(r_g)$. The system continues then to block 216 where the display is updated. The current strike data making up the new cell is stored in system memory and is treated thereafter as an existing active cell with respect to subsequently detected lightning strikes.

According to a second criterion, a strike represents a new active cell in block 220 if the strike is one of a multi-strike lightning "flash". Flashes will typically include 3 to 4 strikes, but sometimes as many as 25 strikes, at the same bearing angle and separated by 20 to 100 milliseconds (msec). In the exemplary embodiment, a "flash" is considered to be two or more strikes having bearings within five degrees of one another and that occur within 0.5 seconds of one another, although other definitions could be used in different embodiments.

Figure 8B:
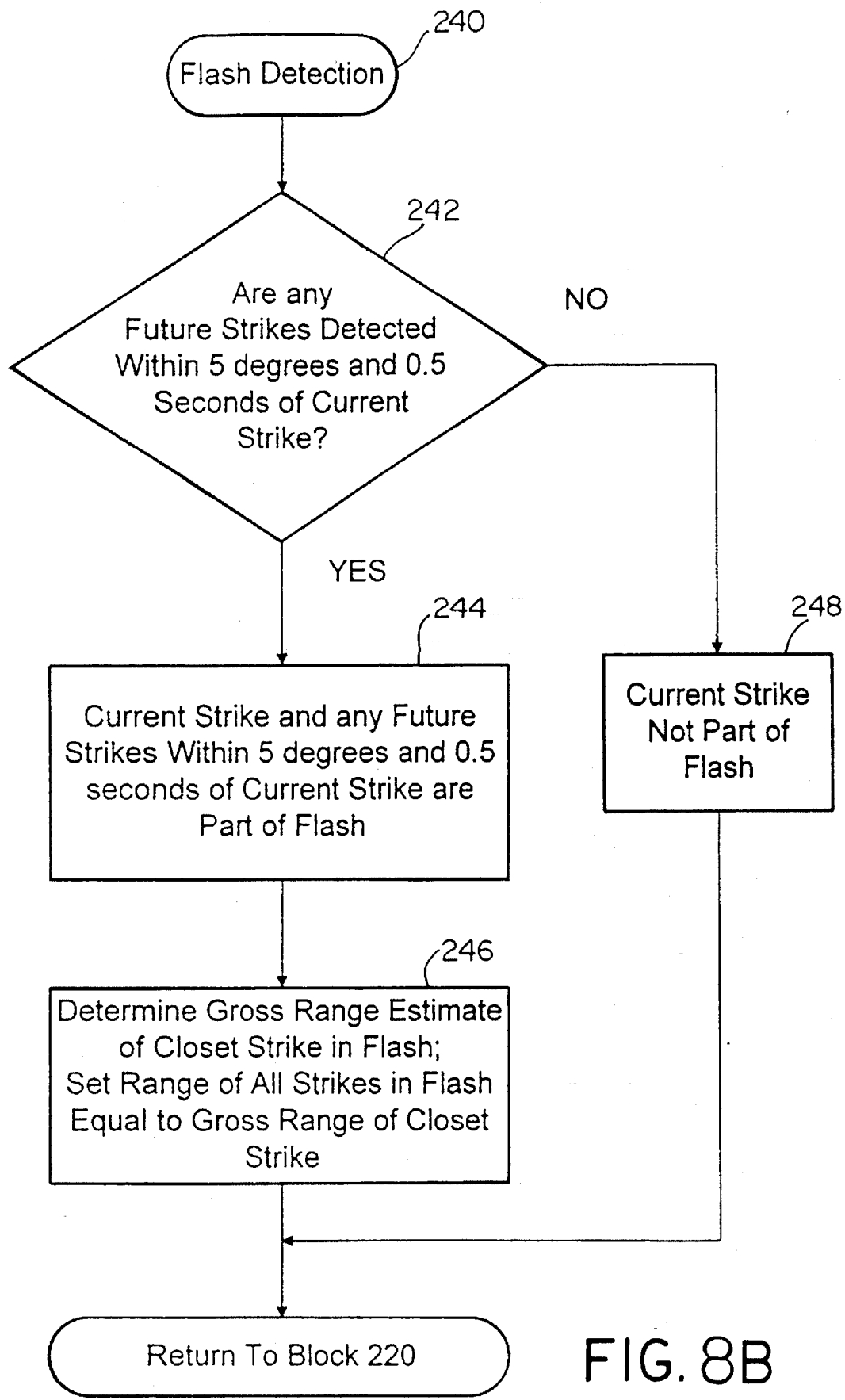
FIG. 8B is a software flow chart suitable for programming the system to determine if a lightning flash has occurred in accordance with the present invention.

FIG. 8B shows an exemplary software flowchart for programming the DSP 46 beginning with block 240 to detect a flash condition for purposes of identifying a new cell in block 220. In block 242, the DSP 46 determines whether any lightning strikes are detected occurring after the lightning strike currently being processed are detected within five degrees and 0.5 seconds of the current strike. In this way, the system continuously looks at a 0.5 second advance "window" to see if the strike being processed is part of a flash. If any additional strikes occur within five degrees and 0.5 seconds, the system proceeds to block 244 in which the current strike and any future strikes within five degrees and 0.5 seconds are identified as being part of the same flash and are processed as follows: in block 246, the DSP 46 determines the closest strike included in the flash by identifying the minimum gross range estimate associated with the strikes included in the flash. The DSP 46 then sets the range estimate r for all the strikes detected in the flash equal to the gross range estimate $r_g$ for the closest strike. This is because all strikes originating from a flash are assumed to occur at substantially the same range. The range corresponding to the closest of all strikes in the flash is used in block 246 to establish the range of the entire flash because a flash typically consists of one or more ground strokes, and sometimes also includes some leader activity. The first ground stroke is typically the strongest, and subsequent strokes are typically one-half or so as strong as it predecessor. The present embodiment assumes the closest stroke is the strongest, and most likely corresponds to the first ground stroke; but it will be appreciated that other means of estimating range from the plurality of strokes in the flash could be used without departing from the scope of the invention.

If in block 242 the DSP 46 determines that no additional lightning strikes occur within five degrees and 0.5 seconds of the current strike, the system proceeds to block 248 in which it concludes that the current strike is not part of a flash. Following either block 246 or block 248, the system returns to block 220 of FIG. 7. In the event the detected lightning strike was identified as being part of a flash in the process of FIG. 8B, the DSP 46 forms a new cell in the corresponding bearing bin. The new cell includes the identical range and respective bearing data for each of the strikes occurring in the flash as determined in block 246 of FIG. 8B. The data for the new cell is stored in system memory and is then treated as an existing active cell for subsequent lightning strikes. The display is updated in block 216 whereby the strike data in the new cell is included in the display, and the system proceeds to block 218.

If in block 220 the detected lighting strike is determined not to represent a new cell, then it is declared to be not a valid lightning signal, and is neither compressed nor plotted. In such case, the strike data is suppressed and the system proceeds directly from block 220 to block 218. The system then returns to block 200 to await detection of the next lightning strike. The above-described procedures are then repeated for subsequent strikes, the majority of strikes having gross range estimates which are compressed in accordance with the mean of the closest existing cell or which are used to establish new cells. Because the system is based on the tendency of lightning strikes to follow a log-normal range distribution, the system allows the range estimates to converge more accurately on the actual location of the active cells.

Figure 9:
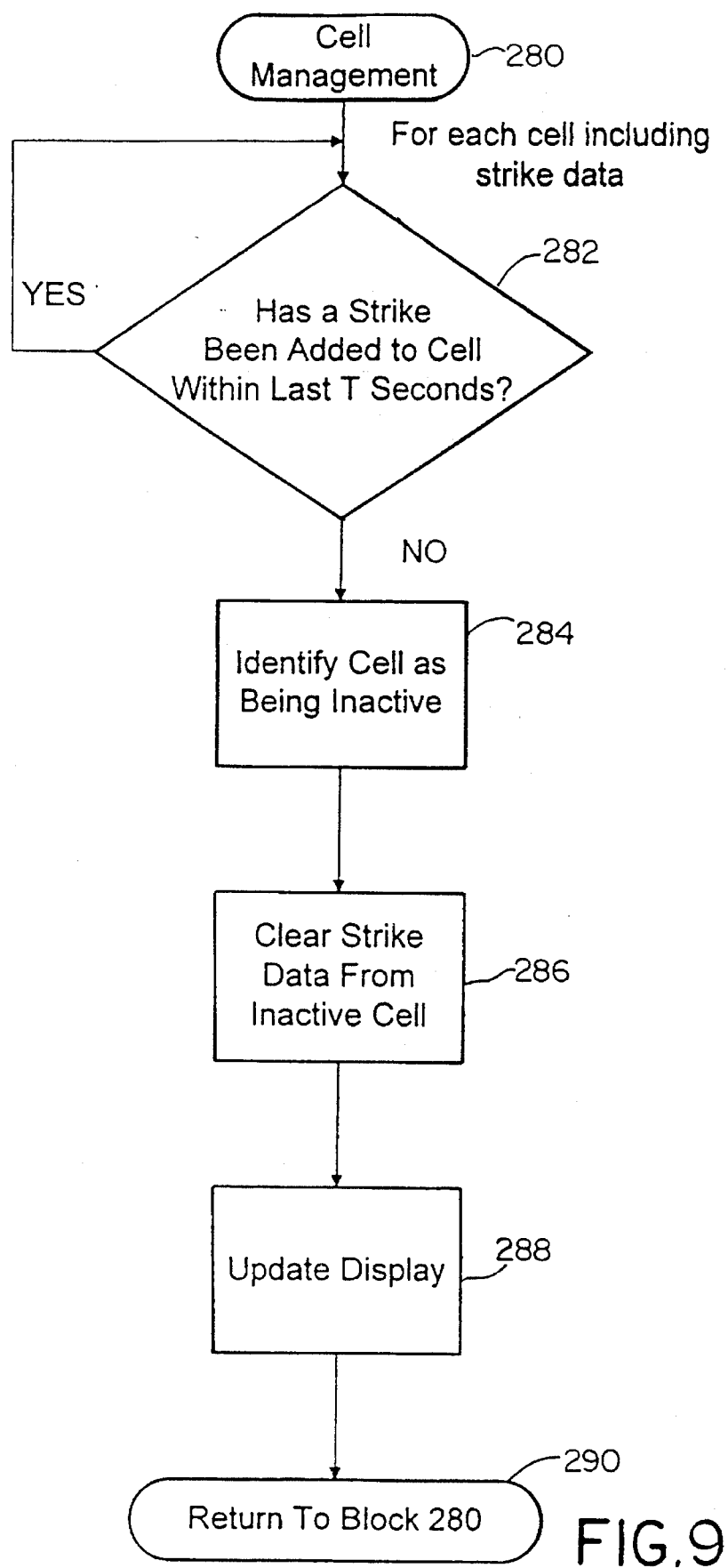
FIG. 9 is a software flow chart suitable for programming the system to manage active cells in accordance with the present invention.

Referring now to FIG. 9, a cell management and tracking feature of the present invention will be described. FIG. 9 represents a software flow chart for programming the microcontroller 70 and DSP 46 to manage cell activity in the respective bearing bins so that tracking information can be displayed. Beginning at block 280 with the initiation of the lightning detection and mapping mode, the microcontroller 70 and DSP 46 monitor the ongoing cell activity for all of the active cells. In the preferred embodiment, however, an active cell is considered to have gone inactive if no new strikes are associated with that cell via block 210 or block 222 (FIG. 7) within a preselected time period. If the cell is considered inactive, the system clears the strike data associated with that particular cell from the system memory. Thus, when the display is updated, an inactive cell will no longer appear on the display. In this manner, active lightning cells which are moving in location relative to the origin will tend to result in new active cells being created along the direction of movement. At the same time, active cells at the tail end of such movement will eventually become inactive and will be cleared from the display. Thus, the system will tend to track the active cells as they move in location.

Referring again to block 280, a preferred embodiment for monitoring the cell activity is as follows: in block 282, the microcontroller 70 and/or the DSP 46 is programmed to determine for each active cell stored in the system memory whether a new strike has been added to the active cell within the last T seconds. If yes, the respective cells are considered to continue to be active and the system remains in a loop about block 280. If not, those cells in which there has been no new strikes added are identified in block 284 as being inactive. In the preferred embodiment, the time period T is set equal to 50 seconds; however, another time period can be used without departing from the scope of the invention.

In block 286, the system clears the strike data stored in system memory in relation to any cells identified as being inactive. The system then updates the display in block 288 whereby the lightning strike data associated with the inactive cells no longer appear on the display. The actual updating of the display in block 288 can be programmed to occur after a brief delay (e.g., five minutes) following the identification of any cells as being inactive so as to provide a margin for safety for an aircraft, for example. With block 290, the system returns to block 280 whereby the system continues to monitor cell activity.

It will therefore be appreciated that the system in accordance with the present invention performs a statistical-based analysis of single-strike range data for a plurality of lightning strikes and compresses the range data based on the analysis. The single strike data for each strike includes a gross range estimate $r_g$ and a bearing estimate θ. The single-strike bearing estimate θ for each strike is assumed to be sufficiently accurate to not require compression.

The system measures and classifies the single-strike data for each new strike into a corresponding bearing bin. The bearing estimate for each new strike is equal to the single-strike bearing estimate. The range estimate for each strike is found by first attempting to associate the strike with an active cell in the corresponding bearing bin. In the event the strike can be associated with an active cell, the range estimate of the strike is set equal to the logarithmic mean of the range distribution of the other strikes originating from the same active cell. If the strike cannot be associated with an active cell in the bearing bin, one or more tests are performed to determine if the strike establishes a new cell. This process is then repeated for the next lightning strike. The system continues to monitor the lightning strike data and the active cells. If no activity occurs in an active cell within a predetermined amount of time, the cell is considered to have become inactive. As thunderstorm cells are created and dissipated, the system will detect the new cells and continue to provide location information on the display until such times as the cells dissipate and become inactive.

The preferred embodiment provides no special provisions for splitting or combining cells. Such splitting or combining occurs naturally in the time evolution of the cell location and tracking process. In another embodiment, the system can be programmed to detect when the mean ranges of two cells become sufficiently close (e.g., within one standard deviation) and then to combine the cell data for both cells into one active cell.

The present invention as described above uses a fixed range standard deviation $\sigma$ (e.g., $\sigma=0.21$) which was obtained by analyzing LPATS amplitude data. However, it will be appreciated that in another embodiment the standard deviation can be based on another criteria. For example, the value of $\sigma$ can be set equal to the range estimate standard deviation produced by the specific single strike processing algorithm utilized for obtaining the gross range estimate and bearing estimate. As another example, $\sigma$ can be estimated from cell strike data similarly to the way in which the mean $m_i$ is estimated.

The present invention has been described herein primarily in the context of utilizing the mean of the range data in logarithmic space. However, the principles of the invention can be carried out based on one or more other characteristics of the logarithmic distribution such as the logarithmic median of the active cell. In other words, the above-described procedures can be carried out using the median of the active cell data in place of the mean. New strikes associated with an active cell are in turn assigned a range estimate corresponding to the cell median. In either case, the range estimates will tend to converge towards the center of the cell. Furthermore, although the present invention has been described primarily as operating using base 10 logarithms, it will be appreciated that other base logarithms can be used such as base e logarithms in particular.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A thunderstorm cell detection and mapping system, comprising:
   means for acquiring lightning strike information relating to locations of respective lightning strikes;
   means for clustering said lightning strikes into groups corresponding to respective active thunderstorm cells by determining a logarithmic distribution of said lightning strike information;
   means for locating said active thunderstorm cells based on said lightning strike information; and
   wherein said lightning strike information comprises range data indicative of ranges of said lightning strikes, and said means for clustering comprising means for associating each of said lightning strikes with one of said active thunderstorm cells based on a logarithmic distribution of said range data.

2. The system in accordance with claim 1, wherein said lightning strike information further comprises bearing data indicative of a bearing of said lightning strikes, and said means for associating associates said respective lightning strikes with said active thunderstorm cells as a function of said bearing data.

3. The system in accordance with claim 1, wherein said means for locating determines the location of each of said active thunderstorm cells based on a statistical distribution of said lightning strike information pertaining to said lightning strikes clustered in said group corresponding to said active thunderstorm cell.

4. The system in accordance with claim 3, wherein said statistical distribution comprises a logarithmic-normal distribution.

5. The system in accordance with claim 4, wherein said location of each of said active thunderstorm cells is determined based on a mean of said logarithmic-normal distribution.

6. The system in accordance with claim 4, wherein said location of each of said active thunderstorm cells is determined based on a median of said logarithmic-normal distribution.

7. The system in accordance with claim 1, further comprising means for monitoring an activity level of each of said active thunderstorm cells.

8. The system in accordance with claim 1, further comprising means for displaying said location of said active thunderstorm cells.

9. A thunderstorm cell detection and mapping system, comprising:
   means for acquiring lightning strike data relating to respective lightning strikes;
   means for calculating a range estimate for each of said respective lightning strikes based on said lightning strike data;
   means for clustering said lightning strikes into groups corresponding to respective active thunderstorm cells by determining a logarithmic distribution of said range estimates; and
   means for locating each of said active thunderstorm cells based on said range estimates for said lightning strikes included in said group corresponding to said active thunderstorm cell.

10. The system in accordance with claim 9, wherein for each of said groups a logarithmic distribution of said range estimates corresponding to said lightning strikes included therein has a standard deviation within a predetermined threshold.

11. The system in accordance with claim 9, further comprising means for displaying the location of each of said active thunderstorm cells.

12. The system in accordance with claim 9, further comprising means for displaying said groups of lightning strikes.

13. The system in accordance with claim 9, further comprising means for calculating a bearing estimate for each of said respective lightning strikes based on said lightning strike data, and wherein said means for clustering clusters said lightning strikes into said groups as a function of said bearing estimates.

14. The system in accordance with claim 13, wherein said bearing estimates corresponding to said lightning strikes in each of said groups are within a predetermined range of each other.

15. The system in accordance with claim 9, wherein in said means for clustering comprises means for refining said range estimate for at least one of said lightning strikes in said group based on said range estimates for other of said lightning strikes included in said group.

16. The system in accordance with claim 15, wherein said refined range estimate is based on a logarithmic distribution of said range estimates for said other lightning strikes.

17. The system in accordance with claim 16, wherein said refined range estimate is based on at least one of a mean and median of said logarithmic distribution of said range estimates for said other lightning strikes.

18. A thunderstorm cell detection and mapping system with invalid data rejection capabilities, comprising:

means for receiving lightning strike data representative of a detected lightning strike;

means for associating said detected lightning strike with an existing active thunderstorm cell in the event a first predetermined criteria is satisfied, said first predetermined criteria being based on a comparison of a logarithm of said lightning strike data representative of said detected lightning strike with logarithms of other lightning strike data representative of other lightning strikes previously associated with said active thunderstorm cell;

means for associating said detected lightning strike with a new active thunderstorm cell in the event a second predetermined criteria is satisfied; and means for rejecting said lightning strike data representative of said detected lightning strike as being invalid in the event neither said first nor second criteria is satisfied.

19. A system for estimating a location of a detected lightning strike with reference to an observation location, said system comprising:

means for receiving signals related to locations of respective lightning strikes relative to said observation location;

means for determining a characteristic of a logarithmic distribution of at least a plurality of said signals;

means for estimating said location of at least one of said lightning strikes based on said characteristic; and wherein said signals comprise range data indicative of a range of said lightning strikes, and said means for determining comprises means for obtaining said logarithmic distribution by taking a logarithm of said range data.

20. The system in accordance with claim 19, wherein said logarithmic distribution tends toward a logarithmic-normal distribution.

21. The system in accordance with claim 19, said characteristic comprises a mean of said logarithmic distribution.

22. The system in accordance with claim 21, wherein said estimating means estimates said location of said at least one of said lightning strikes as being substantially related to said mean.

23. The system in accordance with claim 19, wherein said characteristic comprises a median of said logarithmic distribution.

24. The system in accordance with claim 23, said estimating means estimates said location of said at least one of said lightning strikes as being substantially related to said median.

25. The system in accordance with claim 19, further comprising means for identifying active cells represented by said respective lightning strikes and means for associating said signals with said active cells, and wherein said means for determining comprises means for calculating for each active cell a logarithmic distribution of said signals which are associated with said respective active cells.

26. The system in accordance with claim 25, wherein said estimating means estimates said location of said at least one of said lightning strikes as being substantially related to at least one of a mean and median of said logarithmic distribution for said active cell with which said at least one of said lightning strikes is associated.

27. The system in accordance with claim 25, further comprising means for identifying active cells which have become inactive.

28. The system in accordance with claim 19, further comprising means for displaying said estimated location.

29. A system for estimating a location of a detected lightning strike with reference to an observation location, said system comprising:

means for receiving signals related to locations of respective lightning strikes relative to said observation location;

means for calculating a gross range estimate for each of said respective lightning strikes based on said received signals;

means for determining a characteristic of a logarithmic distribution of at least a plurality of said gross range estimates; and means for refining at least one of said gross range estimates based on said characteristic to form a compressed range estimate.

30. The system in accordance with claim 29, each of said gross range estimates having associated therewith a corresponding bearing estimate and further comprising means for associating said at least one of said gross range estimates with one of a plurality of predefined bearing bins based on said corresponding bearing estimate, and wherein said means for determining determines said characteristic based on a plurality of said gross range estimates identified by said associating means as being associated with said one of said bearing bins.

31. The system in accordance with claim 30, wherein said compressed range estimate is substantially related to a mean of said logarithmic distribution.

32. The system in accordance with claim 30, wherein said compressed range estimate is substantially related to a median of said logarithmic distribution.

33. The system in accordance with claim 29, wherein said logarithmic distribution includes base 10 logarithms.

34. The system in accordance with claim 29, wherein said logarithmic distribution includes base e logarithms.

35. The system in accordance with claim 29, further comprising means for detecting lightning flashes and wherein said means for refining refines said at least one of said gross range estimates as a function of whether said at least one of said gross range estimates is detected as being part of a lightning flash.

36. A lightning strike detection and mapping system, comprising:

means for receiving signals indicative of locations of respective lightning strikes;

means for obtaining logarithmic distribution information which is based on said signals;

means for providing location information for at least one of said lightning strikes based on said logarithmic distribution information; and means for processing said signals to provide range estimates for each of said respective lightning strikes, and wherein said means for obtaining comprises means for calculating a logarithm of each of said range estimates.

37. A method of detecting and mapping lightning strikes, comprising the steps of:

acquiring lightning strike range data relating to range locations of respective lightning strikes;

adopting a statistical model for a distribution of said range data;

clustering said lightning strikes into groups corresponding to respective active thunderstorm cells by applying a statistical analysis of said range data based on said statistical model; and locating said active thunderstorm cells based on said range data.

38. The method of claim 37, wherein said lightning strikes are clustered into said groups by use of statistical based averaging of said range data.

39. The method of claim 37, wherein the step of adopting includes the step of adopting a logarithmic-normal model for the statistical model.

* * * * *